United States Patent
Scholz et al.

(10) Patent No.: US 8,327,991 B2
(45) Date of Patent: Dec. 11, 2012

(54) SLAVE CYLINDER AND RELEASE SYSTEM

(75) Inventors: Peter Scholz, Karlsruhe (DE); Thomas Rammhofer, Sasbach (DE); Christof Sester, Gengenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 236 days.

(21) Appl. No.: 12/760,300

(22) Filed: Apr. 14, 2010

(65) Prior Publication Data

US 2010/0252391 A1    Oct. 7, 2010

Related U.S. Application Data

(63) Continuation of application No. PCT/DE2008/001559, filed on Sep. 18, 2008.

(30) Foreign Application Priority Data

Oct. 15, 2007   (DE) .................. 10 2007 049 254

(51) Int. Cl.
*F16D 25/08*   (2006.01)
(52) U.S. Cl. ............ 192/85.5; 192/30 W; 192/48.606; 192/85.51; 192/85.54
(58) Field of Classification Search .......... 192/48.603, 192/85.5, 85.51, 85.53, 85.54, 48.606
See application file for complete search history.

(56) References Cited

U.S. PATENT DOCUMENTS

| | | | | |
|---|---|---|---|---|
| 2,275,944 A * | 3/1942 | Breese | | 192/85.5 |
| 3,638,773 A | 2/1972 | Lewis et al. | | |
| 4,044,871 A * | 8/1977 | Kiener | | 192/85.5 |
| 4,287,977 A * | 9/1981 | Haga et al. | | 192/85.5 |
| 4,440,281 A * | 4/1984 | Hauguth | | 192/48.8 |
| 4,708,228 A | 11/1987 | Leigh-Monstevens | | |
| 5,052,279 A * | 10/1991 | Limbacher et al. | | 92/169.1 |
| 6,085,884 A * | 7/2000 | Seufert et al. | | 192/30 W |
| 6,102,183 A | 8/2000 | Gerken | | |
| 6,345,710 B1 | 2/2002 | Welter et al. | | |
| 7,828,131 B2 * | 11/2010 | Iwashita et al. | | 192/85.5 |
| 2008/0060900 A1* | 3/2008 | Pick | | 192/85 CA |

FOREIGN PATENT DOCUMENTS

| | | |
|---|---|---|
| DE | 3907030 | 9/1989 |
| DE | 19800232 | 7/1998 |
| DE | 19742468 | 4/1999 |
| DE | 20315735 | 12/2003 |
| EP | 0310570 | 4/1989 |
| FR | 2851627 | 8/2004 |
| FR | 2896287 | 7/2007 |
| GB | 1401596 | 7/1975 |

\* cited by examiner

*Primary Examiner* — Rodney Bonck

(74) *Attorney, Agent, or Firm* — Davidson, Davidson & Kappel, LLC

(57) ABSTRACT

A slave cylinder and a release system, the slave cylinder being configured in particular as a CSC for a hydraulic system of a motor vehicle. While maintaining the axial extension of the working space of the piston axially moveable in the slave cylinder, the force for actuating the clutch is increased in that the pressure chamber is sealed by two sealing elements having different diameters, and in that at least one energy accumulator is disposed in the pressure chamber of the slave cylinder, the energy accumulator generating a preload on the clutch release bearing operative connected to the slave cylinder.

17 Claims, 2 Drawing Sheets

SLAVE CYLINDER AND RELEASE SYSTEM

This is a continuation of prior International Application PCT/DE2008/001559, filed Sep. 18, 2008, which claims priority to German Patent Application DE 10 2007 049 254.7, filed Oct. 15, 2007, the entire disclosures of which are hereby incorporated by reference herein.

The invention relates to a slave cylinder that is disposed concentrically on a transmission input shaft, in particular for a hydraulic system of a motor vehicle.

BACKGROUND

Hydraulic slave cylinders disposed concentrically on the transmission input shaft, the so-called CSC, are known and are already in operation in diverse embodiments in vehicles. In all embodiments, the objective is to hydraulically pressurize a working piston, executed as an annular piston, which is axially movable within a working chamber with a force for actuating a clutch, for instance, in order to separate the latter. This force is transmitted to a release bearing connected with the piston, whereby its clutch or its rotating diaphragm spring finger on the next disposed ring is in contact with the latter.

In these embodiments the pressure chamber is located in direct proximity of the release bearing. These slave cylinders are disposed between the clutch and transmission, thus outside the clutch housing.

In case of lack of space between the clutch and transmission, it is moreover known to integrate the actuator for the clutch or at least the release bearing that is in operative connection with the diaphragm spring fingers inside the clutch housing, wherein the corresponding pressure chamber is located outside the clutch. The connection between the release bearing disposed inside the clutch housing, about the transmission input shaft and the axially movable piston inside the pressure chamber, is established via a coupling element, for instance, an push rod. This push rod thereby acts, depending upon the applied clutch, as a tension or compression rod.

For the development of the force required for actuating the clutch, on the one hand a correspondingly large hydraulic surface area is required, upon which the size of the pressure chamber depends and on the other hand the seal of the pressure chamber against its surrounding is of great importance.

SUMMARY OF THE INVENTION

An object of the invention is to provide a slave cylinder of the type mentioned above, for actuating a clutch with which the pressure force for actuating the clutch is increased whilst retaining the axial extension of the working chamber.

An embodiment of the present invention provides a slave cylinder that is disposed concentrically on a transmission input shaft, in particular for a hydraulic system of a motor vehicle and consists of housing in which a piston is disposed axially in a displaceable manner within a pressure chamber between two end positions, wherein the pressure chamber is sealed by a sealing element. The piston stands above a push rod with a release bearing in an operative connection, which is prestressed by means of at least an energy accumulator. Since the pressure chamber is sealed with dynamic sealing elements featuring two different diameters and at least one energy accumulator is disposed inside the pressure chamber, despite retaining the axial extension of the work chamber, the compressive force for actuating the clutch is increased.

It is thereby advantageous to execute the energy accumulator as a compression spring, wherein the one end of this cylindrical compression spring is supported in a receptacle and the bottom end is supported on the internal contour of the housing. Moreover, it is advantageous for the manufacturing process to form the push rod as a tension- or compression rod.

Beside a cylindrical form, the compression spring can also feature a tapered form.

An advantageous embodiment of the invention provides for the piston to comprise a piston crown and a piston shaft adjoining the latter, wherein the length of the piston at least consists of the pressure chamber.

It is further advantageous that the piston is guide by its piston shaft in a bearing bush provided inside the housing and via the jacket surface of the piston crown inside the housing formed as a sliding surface.

For a positive fit accommodation of the sealing element with the larger diameter in the housing, the latter features a bead through which it is connected with a corresponding groove in the housing.

To determine the position or stroke length of the piston in an advantageous manner, the slave cylinder is provided with a displacement measuring device. For this purpose, a magnetic or a magnetizable section is integrated in the piston crown or the piston is in connection with a magnetic or magnetizable area.

It is particularly advantageous when the displacement measuring device is disposed on the housing of the slave cylinder or in its direct proximity and comprises a non-contact sensor that is in operative connection with the magnetic or magnetizable area.

To avoid losses of power transmission in an advantageous manner, the ends of piston and push rod can be connected with one another, wherein the connection is detachable, for instance, by means of a screw connection or non-detachable, for instance, by means of a piston.

An elastic pot-shaped protection cap, by which the cylindrical section is provided with grooves distributed over the internal circumference so that segments remain between these slits, for increasing the elasticity when lowering it on the housing in an axial direction, serves for closing the pressure-chamber-side housing of the slave cylinder and hence of the pressure chamber as well as for protecting it against dirt. The segments are formed hook-shaped inwards for the formation of snapping segments that interlock with a groove provided in the housing.

Moreover, an embodiment of the invention provides a release system in which a master cylinder is connected via a pressure line with a slave cylinder according to the invention, which actuates the release bearing, wherein the actuation of at least a release bearing occurs through at least a transmission input shaft.

BRIEF DESCRIPTION OF THE DRAWINGS

The invention is explained in detail on the basis of an exemplary embodiment and associated drawings.

The following are shown.

DETAILED DESCRIPTION

Figure 1:
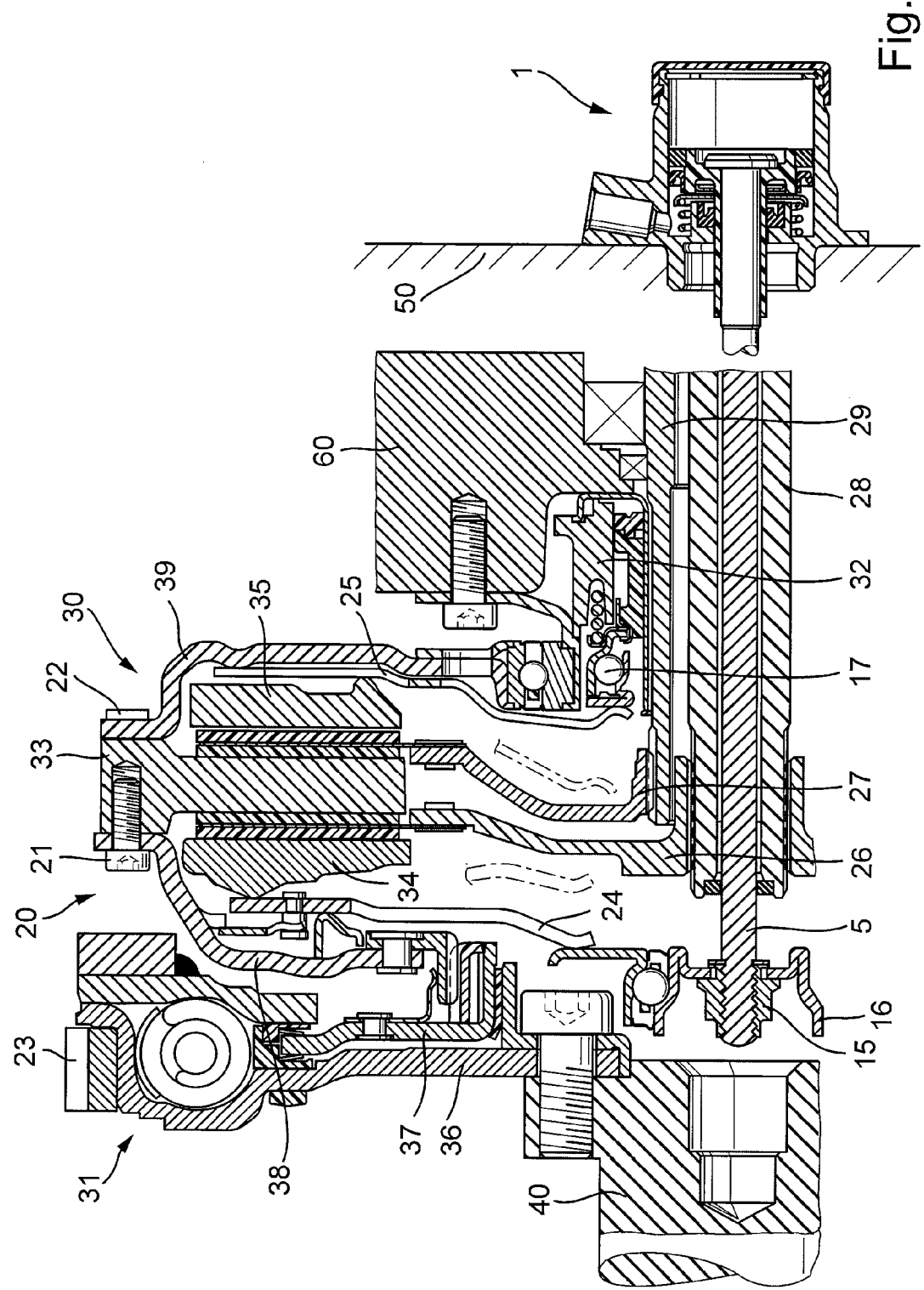
FIG. 1 shows a double clutch with actuation devices for each partial clutch.

In FIG. 1 a part of a drive train of a motor vehicle with the corresponding actuation apparatus 1, 32 is depicted in half-section, wherein the twin clutch is formed of two partial couplings, thus a first partial clutch 20 and a second partial clutch 30. Every partial clutch 20, 30 is concentrically disposed about an associated transmission input shaft 28, 29 and is in operative connection with one of the respective partial clutches 20, 30 based on the assigned release bearing 16, 17. Every release bearing 16, 17 is hydraulically pressurized by a corresponding actuating device 1, 32 with an actuating force. Just like the actuating device 32, the actuating device 1 is formed by a slave cylinder that is likewise disposed concentrically on the corresponding transmission input shaft 28, 29. FIG. 1 shows that, owing to the reasons of adaptation to a reduced assembly space, it is common at least that the release bearing 16 assigned to the first partial clutch 20 is integrated inside the clutch housing and the slave cylinder 1 according to the invention and connected with the latter is transferred to an assembly space outside the interstice of the twin clutch or respectively of clutch bell housing 60 and transmission 50.

Figure 2:
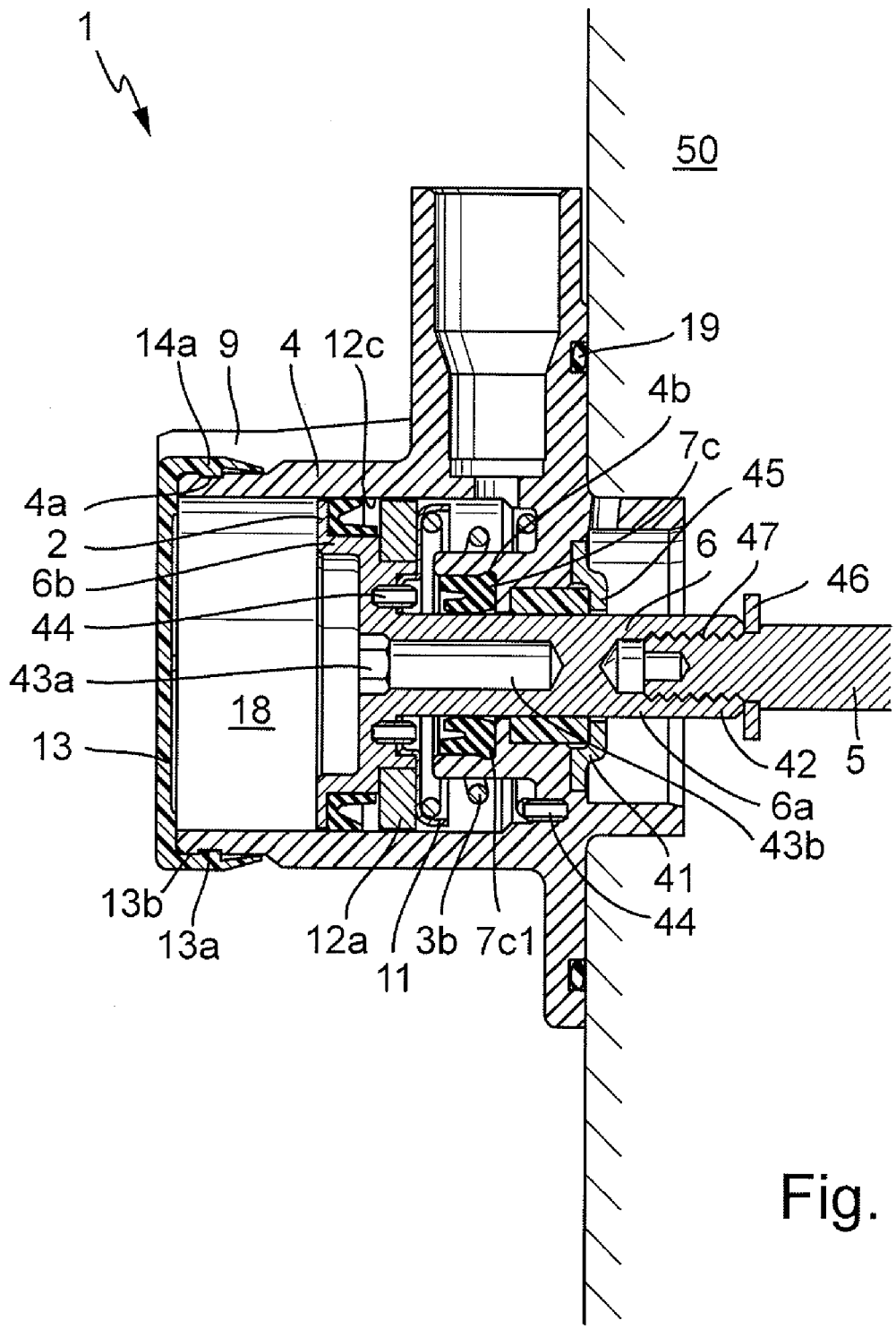
FIG. 2 shows a section of a slave cylinder according to the invention, without a release bearing.

In FIG. 2 the part of the slave cylinder 1 disposed outside the clutch housing is depicted as a single piece. In further description of the Figures, the same reference symbol is used for the same components.

The twin clutch depicted in FIG. 1 is disposed between a drive unit in particular of an internal combustion engine from which a crankshaft 40 extends, and the transmission 50. The partial clutch 30, in that case, depicts a closed clutch; the partial clutch 20 depicts an open clutch. Both partial clutches 20, 30 are respectively disposed on one side of a central flywheel that simultaneously acts as an intermediate pressure plate 33, so that the pressure plate 34, 35 is located opposite both partial clutches 20, 30.

Furthermore, from this FIG. 1, it is evident that an external damper 31 is disposed between the drive unit and the twin clutch. The crankshaft 40 of the internal combustion engine is connected permanently via screw connections with an input part 36 of the damper 31. The input part 36 of the damper 31 has essentially the shape of a circular disk extending in radial direction, which forms a vibration damper cage radially outside. Radially outside is a starter ring gear 23 attached to the input part 36. In the vibration damper cage at least an energy accumulator device, in particular a spring device is at least accommodated partially. In this spring device an output part 37 interlocks in the damper 31.

With the help of screw connections 21, 22 both clutch covers 38, 39 of the clutches 20, 30 are fixed on the common intermediate pressure plate 33. On the drive side, friction linings of a first clutch disk 26 can be clamped between a pressure plate 34 in operative connection with the clutch 20 and the intermediate pressure plate 33. This first clutch disk 26 is connected non-rotatably with the first transmission input shaft 28 via a hub part that is executed as a hollow shaft. The first transmission input shaft 28 is disposed rotatably in the second, transmission input shaft 29 likewise formed as a hollow shaft. A hub part of a second clutch disk 27 is connected non-rotatably with the drive-side end of the second transmission input shaft 29. On the second clutch disk 27 of the clutch 30, friction linings are fixed radially outside, said friction linings can be clamped between the intermediate pressure plate 33 and the pressure plate 35 in operative connection with the clutch 30. The first transmission input shaft 28, in the application of this kind of partial clutches, encloses a tie bar 5, so that this is supported and guided in the center of both transmission input shafts 28, 29.

The twin clutch consisting of both partial clutches 20, 30 is actuated via the slave cylinder 1, 32 disposed concentrically about the transmission input shaft 28, 29 with corresponding release bearings 16, 17 respectively. These release bearings 16, 17 again interact with the actuating levers 24, 25. The actuating levers 24, 25 involve a diaphragm spring 24 on the one hand and on the other hand a lever spring 25. By means of the latter, both pressure plates 34, 35 can be displaced limitedly in axial direction relatively to the intermediate pressure plate 33. The release bearings 16, 17 are pressurized hydraulically. The tie bar 5 in this case serves for actuating the release bearing 16, which is disposed at this end inside the clutch housing. Axial actuation of the tie bar 5 occurs via the slave cylinder 1 disposed outside the clutch housing. The assembly space between the twin clutch and the transmission 50 is reduced in this way. The end of the tie bar 5 projecting inside the clutch housing is provided with a thread so that the release bearing 16 can be fixed on the latter by means of a nut 15. The release bearing 16 is in operative connection with the diaphragm spring 24 by means of an appropriately formed attachment in radial direction of the external bearing race. In contrast to this, in this example, the internal bearing ring of the release bearing 17 is formed such that the latter can undergo an operative connection with the lever spring 25. The actuation of the release bearing 17 occurs by an axial movement of the piston supported inside the housing of the slave cylinder 32 that can be pressurized hydraulically with a compressive force. The release bearing 17 of this slave cylinder 32 is used, space-optimized, flush with the fixed bearing disposed in the clutch cover 39 on the driven side.

FIG. 2 shows in section the slave cylinder 1 according to the invention. In the housing of this slave cylinder 1, a piston 6 is disposed in an axially movable manner The latter consists of a piston crown 6b with a diameter adapted to the internal diameter of the cylinder housing, to which a long-drawn piston shaft 6a adjoins with a significantly smaller diameter. The piston 6 is guided inside the housing 4 over the jacket surface of the piston crown 6b, so that this acts as sliding surface 12c. A pressure chamber 18 is formed between the face surface of the piston crown 6b and the cylinder chamber enclosed by a protective cap 13. With the help of a sealing element 2 integrated inside the piston crown 6b, this pressure chamber 18 is sealed in radial direction and thus the sliding surface 12c during the motion of the piston 6 is sealed against the surrounding. Radial lip seal is used preferably for this dynamic sealing element 2. Besides axial fixation of this sealing element 2, a ring-shaped magnet 12a disposed on the step of the piston crown 6b serves for determining the position or stroke length of the piston 6. Axially, this magnet 12a is positioned by means of a cup-shaped receptacle 11 formed as ring, which is additionally fixed radially with the help of at least a pin 44 formed as lock against rotation, preferably near its internal diameter.

Towards the clutch side, the housing 4 is closed by means of a protective cap 13 that protects the latter from the access effect of dirt.

In this figure, in which the piston 6, additionally guided on its shaft 6a by means of a bearing bush 41 inserted directly in the passage of the piston 6 through the housing 4, assumes one of its two end positions, it is apparent that its path on this side is limited by a limit stop. This limit is implemented by means of the appropriately formed internal contour of the housing 4. The bearing bush 41 is fixed axially by means of a limit stop disk 45 anchored inside the housing 4. The distance limit in the other direction occurs by means of a limit stop disk 46 inserted in the tie bar 5, which is limited with its face surface in this position of the piston 6 on which the limit stop disk 45 is limited in the housing 4.

The protective cap 13 already mentioned above preferably consists of elastic material and is pot-shaped in form, wherein a cylindrical part 14a of the protective cap 13 is provided with grooves 13b extending up to their crown, so that segments distributed over the circumference occur inside the cylindrical part. These segments are provided with elevations directed inwards in the end section. These elevations acts on the housing when the protective cap 13 comes in contact on the housing 4 as snapping segments 13a, since they are first widened radially so that when they hit the crown the snapping segments 13a can snap back into one of the circular grooves 4a provided in the housing 4.

In this shown position of the piston 6, the pressure chamber 18 is very well visible. Besides the moving dynamic sealing element 2, this is also sealed by a dynamic sealing element 7c through the housing 4 fitted in the latter upright in the tie bar 5 passage section. This sealing element 7c preferably, is formed likewise as radial lip seal is provided with a bead 7c1 on the circumference, through which it is axially fixed in a groove 4a formed in the housing 4.

The hydraulic sealing of the slave cylinders 1 and thus of the pressure chamber 18 occurs therefore over the length of the piston 6 and further over the sealing element 2, and additionally via the sealing element 7c used in the housing 4, which serves for sealing of the piston shaft 6a. Therefore the pressure chamber 18 is enclosed by the piston 6, the sealing elements 2 and 7c and the housing 4, wherein the length of the piston 6 at least corresponds to the axial extension of the pressure chamber 18.

In order to attain a possibly great actuating force for the release bearing 16 in FIG. 1 with the piston 6 with a default hydraulic pressure, the hydraulic surface of the pressure chamber 18 required for it should be as large as possible. This hydraulic surface results from the difference between the sealing surfaces of the two seals 2 and 7c. For this reason, in this slave cylinder 1 according to the invention, two sealing elements of different diameters are used for sealing the pressure chamber 18 instead of a single sealing element, whereby the sealing element 2 features a larger diameter and the sealing element 7c a smaller diameter. The sealing of the slave cylinders 1 against the transmission 50, or transmission cavity, in which the transmission fluid is under atmospheric pressure, in this exemplary embodiment is implemented by means of a seal 19 executed as O-ring, which is used in the contact surface of the housing 4 towards the transmission 50.

As apparent from FIG. 2, an energy accumulator 3b is disposed concentrically on the piston shaft 6a inside the pressure chamber 18. This energy accumulator 3b, in this example, formed as a tapered compression spring is supported with one end on the cup-shaped receptacle 11, with which it is at the same time connected. Therefore, the energy accumulator 3b is secured against rotation by means of this receptacle 11, whereby the drag torque arising from the release bearing 16 can be supported. It is supported on the internal contour of the housing 4 with its other end. This energy accumulator 3b, fitted directly inside the pressure chamber 18, as well known, serves the transmission of pre-stressing force to be applied to the release bearing 16. Through this constructive measure, the required assembly space is shortened significantly.

To determine the respective piston position within the piston stroke, on the one hand, the magnet 12a is integrated in or linked to the piston 6 and, on the other hand, a displacement measuring device 9 is formed as a non-contact sensor. This is disposed outside the housing 4. A permanent magnet is used advantageously as magnet 12a. However, also local magnetization of the piston material or a disc with a magnetic or magnetizable section is considerable instead of the magnet 12a.

The magnitude of the piston stroke is determined by its two limit stops. For the movement of the piston 6, i.e. during the piston stroke, the air trapped inside will be compressed between the protective cap 13 and the chamber up to the piston crown 6b, which, by acting as buffer, shortens the default piston stroke and hence influences the release process inconveniently. For this reason, the snapping segments 13a of the protective cap 13 simultaneously assume a valve function owing to its radial spreading possibility.

As already mentioned, the release bearing 16 depicted in FIG. 1 is connected with the piston 6 via the tie bar 5. This connection is implemented, as depicted in FIG. 2, for instance, by means of a screw connection through which the ends of the piston 6 and tie bar 5 are connected with one another. To boost the tightening torque during the screwing process, a cutout is embossed in the form of an hexagon 43a in the center of the face surface of the piston crown 6b, on to which a blind hole 43b adjoins, in order to be capable of receiving a corresponding tool. Lower connections, both detachable as well as non-detachable are likewise considerable. In this manner, also a detachable connection, for instance a bayonet connection or a simple bolt-hole connection can be chosen, and radially fixes this connection axially and radially by means of a pin penetrating the latter. A non-detachable connection, for instance, could be established by adhesion or by corresponding material selections by means of frictional welding. The choice of the connection is based on the dimensions to be adapted in accordance with the assembly space conditions of the two components, as well as their materials and the forces to be expected at the connection point.

LIST OF REFERENCE SYMBOLS 1 slave cylinder/actuating device
2 sealing element
3b energy accumulator
4 housing
4a groove
4b groove
5 tie bar
6 piston
6a piston rod
6b piston crown
7c sealing element
7c1 bead
9 displacement measuring device/sensor
11 annular receptacle
12a magnet/magnetized section
12c sliding surface
13 protective cap
13a snapping segment
13b groove
15 nut
16 actuating bearing/release bearing for first partial clutch
17 actuating bearing/release bearing for second partial clutch
18 pressure chamber
19 seal
20 first partial clutch (drawn clutch)
21 screw connection
22 screw connection
23 starter ring gear
24 diaphragm spring/actuating lever
25 diaphragm spring/actuating lever
26 first clutch disk
27 second clutch disk
28 first transmission input shaft
29 second transmission input shaft
30 second partial clutch (pressed clutch)
31 damping device
32 slave cylinder/actuating device 33 central flywheel/intermediate pressure plate
34 pressure plate
35 pressure plate
36 input part
37 output part
38 clutch cover
39 clutch cover
40 crankshaft
41 bearing bush
42 thread
43a hexagon screw
43b blind hole
44 non-rotational lock/pin
45 limit stop disk
46 limit stop disk
47 screw connection
50 transmission
60 clutch housing

What we claim is:

1. A slave cylinder disposed concentrically on a transmission input shaft comprising:
    a housing delimiting a pressure chamber;
    a piston disposed in an axially sliding manner within the pressure chamber between two end positions;
    a push rod operatively connecting the piston with a release bearing;
    at least an energy accumulator in the pressure chamber receiving a prestressing from the release bearing; and
    two sealing elements disposed inside the pressure chamber sealing the pressure chamber, at least one of the two sealing elements being a radial lip seal,
    wherein the two sealing elements include a first sealing element of a first diameter and a second sealing element of a second diameter smaller than the first diameter, the energy accumulator surrounding the second sealing element.

2. The slave cylinder according to claim 1, wherein the energy accumulator is a cylindrical compression spring by which end windings are supported in a receptacle and on the internal contour of the housing.

3. The slave cylinder according to claim 1, wherein the piston consists of a combination of a piston crown and a piston shaft adjoining the latter.

4. The slave cylinder according to claim 3, wherein the piston is guided via the piston shaft in a bearing bush provided inside the housing.

5. The slave cylinder according to claim 3, wherein the piston crown is integrated with a magnetic or magnetizable section.

6. The slave cylinder according to claim 3 wherein the housing includes an axial extension extending axially towards the piston crown.

7. The slave cylinder according to claim 6 wherein the energy accumulator is radially outside of the axial extension and one of the two sealing elements is held on a radially interior surface of the axial extension.

8. The slave cylinder according to claim 3, wherein a first end of the piston shaft is connected to the piston crown and a second end of piston shaft opposite of the first end is connected with the push rod.

9. The slave cylinder according to claim 1, further comprising a displacement measuring device determining a position or stroke length of the piston.

10. The slave cylinder according to claim 9, wherein the displacement measuring device consists of a non-contacting sensor.

11. The slave cylinder according to the claim 1, wherein the piston is in connection with a magnetic or magnetizable section.

12. The slave cylinder according to claim 1, wherein ends of the piston and the push rod are connected with one another.

13. The slave cylinder according to claim 1, further comprising an elastic, pot-shaped protective cap sealing the housing.

14. A release system comprising:
    a master cylinder;
    the slave cylinder according to claim 1; and
    a release bearing, the slave cylinder actuating the release bearing, the push rod being coupled to the release bearing outside of the housing, the master cylinder and the slave cylinder being connected with one another via a pressure line.

15. The release system according to claim 14, wherein an actuation of at least the release bearing occurs at least through the transmission input shaft.

16. The slave cylinder according to claim 1 wherein the salve slave cylinder is for a hydraulic system of a motor vehicle.

17. A slave cylinder disposed concentrically on a transmission input shaft comprising:
    a housing delimiting a pressure chamber;
    a piston disposed in an axially sliding manner within the pressure chamber between two end positions;
    a push rod operatively connecting the piston with a release bearing;
    at least an energy accumulator in the pressure chamber receiving a prestressing from the release bearing; and
    two sealing elements disposed inside the pressure chamber sealing the pressure chamber, at least one of the two sealing elements being a radial lip seal,
    wherein the piston consists of a combination of a piston crown and a piston shaft adjoining the latter,
    wherein the housing includes an axial extension extending axially towards the piston crown.

* * * * *